US012691912B2

(12) United States Patent (10) Patent No.: US 12,691,912 B2

Boegl et al. (45) Date of Patent: Jul. 28, 2026

(54) BOGIE FOR A GUIDEWAY-BOUND LEVITATION VEHICLE

(71) Applicant: MAX BOEGL STIFTUNG & CO. KG, Sengenthal (DE)

(72) Inventors: Stefan Boegl, Sengenthal (DE); Bert Zamzow, Stockdorf (DE); Stefan Friess, Berching (DE)

(73) Assignee: MAX BOEGL STIFTUNG & CO. KG, Sengenthal (DE)

( * ) Notice: Subject to any disclaimer, the term of this patent is extended or adjusted under 35 U.S.C. 154(b) by 505 days.

(21) Appl. No.: 18/269,476

(22) PCT Filed: Dec. 29, 2021

(86) PCT No.: PCT/EP2021/087787

§ 371 (c)(1),
(2) Date: Jun. 23, 2023

(87) PCT Pub. No.: WO2022/144388

PCT Pub. Date: Jul. 7, 2022

(65) Prior Publication Data

US 2024/0092402 A1 Mar. 21, 2024

(30) Foreign Application Priority Data

Dec. 29, 2020 (DE) .......................... 102020135037.6

(51) Int. Cl.
*B61B 13/08* (2006.01)
*B60L 13/04* (2006.01)

(52) U.S. Cl.
CPC .............. *B61B 13/08* (2013.01); *B60L 13/04* (2013.01); *B60L 2200/26* (2013.01)

(58) Field of Classification Search
CPC .. B61B 13/08; B61B 3/00; B61B 5/00; B60L 13/04; B61F 3/00; B61F 5/00

(Continued)

(56) References Cited

U.S. PATENT DOCUMENTS 4,516,505 A * 5/1985 Heidelberg ............. B61B 13/08
104/284
5,203,265 A * 4/1993 Nii ........................... B66B 9/02
104/127

(Continued)

FOREIGN PATENT DOCUMENTS

CN 1458022 A 11/2003
CN 101624054 A * 1/2010

(Continued)

OTHER PUBLICATIONS

Office Action in EP21844763.9 dated Jun. 11, 2025 with English translation (13 pages).

(Continued)

*Primary Examiner* — Troy Chambers

(74) *Attorney, Agent, or Firm* — Foley & Lardner LLP

(57) ABSTRACT

The invention relates to a bogie (1) for a guideway-bound levitation vehicle (7) of a magnetic levitation system, with two rows (21, 22) of multiple levitation frames (2) spaced apart from each other in a transverse direction (Y) of the bogie (1) and extending in a longitudinal direction (X) of the bogie (1), with at least two cross members (3) spaced apart from each other in the longitudinal direction (X) and extending in the transverse direction (Y) and connecting the two rows (21, 22) of multiple levitation frames (2) to each other, with at least one longitudinal member (4) extending in the longitudinal direction (X) and connected to the cross members (3), and with at least one receiving means (18) for receiving a vehicle compartment (8) of the levitation vehicle (7). According to the invention, two longitudinal members (4) spaced apart from each other in the transverse direction (Y) are arranged between two cross members (3) spaced apart from each other in the longitudinal direction (X) and (Continued)

are connected to these two cross members (3) The invention further relates to a bogie.

13 Claims, 4 Drawing Sheets

(58) Field of Classification Search
USPC ......................................................... 104/281
See application file for complete search history.

(56) References Cited

U.S. PATENT DOCUMENTS

| | | | | |
|---|---|---|---|---|
| 6,439,513 | B1 * | 8/2002 | Pascoe | B61L 3/225 |
| | | | | 246/122 R |
| 8,091,483 | B1 * | 1/2012 | Sumner | A63G 3/00 |
| | | | | 104/73 |
| 2011/0061559 | A1 * | 3/2011 | Lund | B60L 5/36 |
| | | | | 191/29 R |

FOREIGN PATENT DOCUMENTS

| | | | | | |
|---|---|---|---|---|---|
| CN | 201901013 | U | 7/2011 | | |
| CN | 203902569 | U | 10/2014 | | |
| CN | 106347168 | A | 1/2017 | | |
| CN | 110341742 | A | 10/2019 | | |
| CN | 110588361 | A | 12/2019 | | |
| CN | 111845372 | A | 10/2020 | | |
| DE | 31 07 341 | A1 | 9/1982 | | |
| EP | 3 689 664 | A1 | 8/2020 | | |
| KR | 101173492 | B1 * | 8/2012 | ............... | B61F 5/42 |

OTHER PUBLICATIONS

International Search Report and Written Opinion in PCT/EP2021/087787 dated Apr. 13, 2022, with English translation (24 pages).

* cited by examiner

BOGIE FOR A GUIDEWAY-BOUND LEVITATION VEHICLE

This application is a U.S. national phase application under 35 U.S.C. § 371 of International Application No. PCT/EP2021/087787, filed on Dec. 29, 2021, which claims priority to German Patent Application 102020135037, filed Dec. 29, 2020, both of which are incorporated herein by reference in their entireties.

The present invention relates to a bogie for a guideway-bound levitation vehicle of a magnetic levitation system, including two rows of multiple levitation frames which are spaced apart from each other in a transverse direction of the bogie and extend in a longitudinal direction of the bogie, including at least two cross members which are spaced apart from each other in the longitudinal direction and extend in the transverse direction and which are arranged between the levitation frames spaced apart in the transverse direction and are connected thereto, including at least one longitudinal member which extends in the longitudinal direction and is connected to the cross members, and including at least one receiving means for receiving a vehicle cabin of the levitation vehicle.

CN 106347168 A discloses a bogie for a guideway-bound levitation vehicle of a magnetic levitation system. The bogie comprises cross members and longitudinal members, wherein multiple layers or planes are arranged on top of one another at longitudinal members.

It is therefore the object of the invention to improve the prior art.

The object is achieved by a bogie and a levitation feature having the features of the independent claims.

A bogie for a guideway-bound levitation vehicle of a magnetic levitation system is described.

The bogie comprises two rows of multiple levitation frames which are spaced apart from each other in a transverse direction of the bogie and extend in a longitudinal direction of the bogie. The two rows of levitation frames thus correspond to a track including two rails.

The bogie furthermore comprises at least two cross members which are spaced apart from each other in the longitudinal direction and extend in the transverse direction and which connect the two rows of levitation frames to each other.

In addition, the bogie comprises at least one longitudinal member which extends in the longitudinal direction and is connected to the cross members.

The bogie further comprises at least one receiving means for receiving a vehicle cabin of the levitation vehicle.

The bogie moreover preferably comprises at least one suspension for spring mounting the vehicle cabin with respect to the bogie.

In particular, the cross members and/or the longitudinal members can be a support element for the vehicle cabin.

According to the invention, two longitudinal members, which are spaced apart from each other in the transverse direction, are arranged between two cross members, which are spaced apart from each other in the longitudinal direction, and are connected to these two cross members. As a result, the vehicle cabin can be supported by the cross and longitudinal members in a more stable manner.

It is advantageous when only one cross member is arranged between two levitation frames that are spaced apart from each other in the transverse direction and is connected to the two levitation frames. As a result, the levitation frames are able to pivot relative to the cross member during cornering of the bogie.

In addition or as an alternative, it is advantageous when the first cross member of the two cross members between which the two longitudinal members are arranged is arranged between two levitation frames that are spaced apart from each other in the transverse direction and is connected thereto, and the second cross member is arranged between two other levitation frames that are spaced apart from each other in the transverse direction and is connected thereto. In particular, the first and second cross members can be arranged in each case between two levitation frame pairs that are directly adjacent to each other in the longitudinal direction. As a result, the first and second cross members are arranged between a total of four levitation frames.

It is advantageous when the longitudinal members are arranged parallel to the levitation frames. In addition or as an alternative, it is advantageous when the longitudinal members are spaced apart from the levitation frames in the transverse direction.

It is advantageous when the cross members are spring mounted with respect to the levitation frames by a first suspension. In addition or as an alternative, it is advantageous when the longitudinal members are spring-mounted with respect to the cross members by a second suspension. With the aid of the first and/or second suspensions, the vehicle cabin can be spring mounted with respect to the bogie.

It is advantageous when the first suspension comprises first spring elements. In addition or as an alternative, the second suspension can have second spring elements.

It is advantageous when the first spring elements comprise conical and/or laminated springs. In addition or as an alternative, the second spring elements can also comprise conical and/or laminated springs.

It is advantageous when the cross members and/or the longitudinal members are designed to be elastic and/or spring-loaded, in particular in a vertical, longitudinal and/or transverse direction. As a result, the cross members and/or the longitudinal members can also contribute to the spring-mounting of the vehicle cabin. The cross members and/or the longitudinal members preferably have a spring constant of less than or equal to 10000 N/mm, in particular in a vertical, longitudinal and/or transverse direction.

It is advantageous when the cross members have two ends, wherein a first end of the cross members is connected to the one levitation frame, and the second end of the cross members located opposite the first end is connected to the levitation frame spaced apart in the transverse direction.

It is advantageous when the longitudinal members have two ends, wherein a first end of the longitudinal members is connected to the one cross member, and the second end of the longitudinal members located opposite the first end is connected to the cross member that is spaced apart in the longitudinal direction.

It is advantageous when the levitation frames have a recess, and the ends of the cross members are arranged in the recess with the respective levitation frames. As a result, the bogie can have a more space-saving design.

It is advantageous when the longitudinal members are rotatably connected to the cross members.

It is advantageous when the receiving means are arranged in a central region of, and in particular centrally in, the longitudinal members.

It is advantageous when the receiving means comprises a strut or the receiving means can receive the strut, at which the vehicle cabin can be arranged, in particular directly.

It is advantageous when the levitation frames are connected to each other in the longitudinal direction by means of longitudinal connections and/or in the transverse direction by means of cross connections. As a result, the cross and longitudinal members only have to transmit the weight of the vehicle cabin to the levitation frames. The cross and longitudinal members thus do not contribute, or only contribute little, to the connection of the individual levitation frames among each other.

Further advantages of the invention are described in the following exemplary embodiments. In the drawings.

Figure 1:
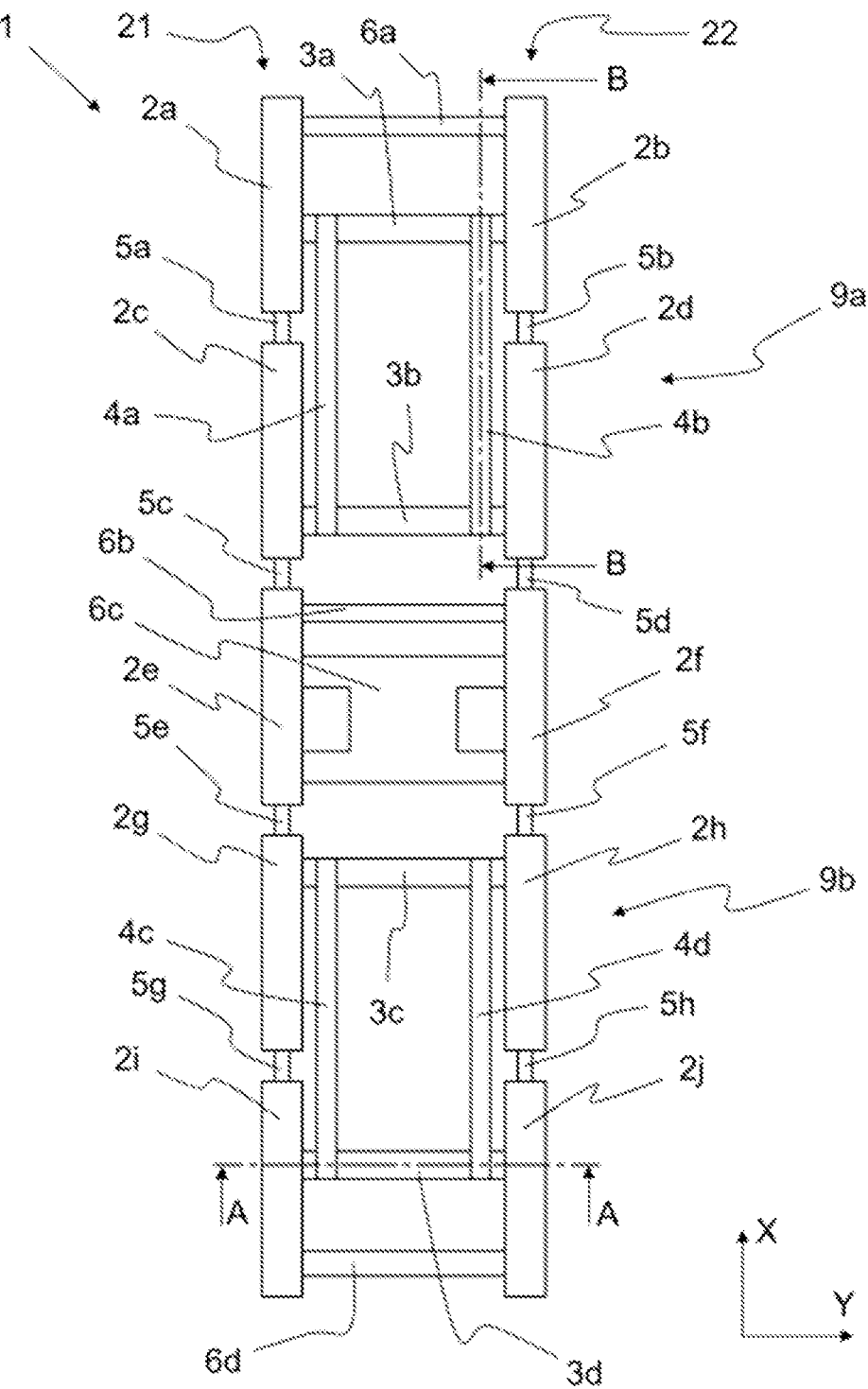
FIG. 1 shows a top view onto a schematic illustration of a bogie for a levitation vehicle.

FIG. 1 shows a top view onto a schematic illustration of a bogie 1 for a levitation vehicle 7. The bogie 1 is in particular intended for a magnetic levitation system, in which the levitation vehicle 7 levitates above a guideway without contact. In the process, the levitation of the levitation vehicle 7 is maintained by means of magnetic force.

The bogie 1 comprises multiple levitation frames 2a-2j, which are arranged so as to be adjacent to each other in the longitudinal direction X and in the transverse direction Y. The bogie 1 comprises two rows 21, 22 of multiple levitation frames 2 which are spaced apart from each other in the transverse direction Y. The levitation frames 2a, 2c, 2e, 2g, 2i form the first row 21, and the levitation frames 2b, 2d, 2f, 2h, 2j form the second row 22. The longitudinal direction X is furthermore parallel to a direction of travel when the levitation vehicle 7 is traveling. In the present exemplary embodiment, the bogie 1 has ten levitation frames 2a-2j, wherein five levitation frames 2a-2j are in each case arranged on each side of the bogie 1. Two levitation frames 2a-2j which are spaced apart from each other in the transverse direction Y can in each case form a levitation frame pair.

The levitation frames 2a-2j can comprise magnets to be able to create the magnetic force necessary for the levitation of the levitation vehicle 6.

According to the present exemplary embodiment, the levitation frames 2a-2j are furthermore connected to each other in the longitudinal direction X by means of longitudinal connections 5a-5h. The longitudinal connections 5a-5h can be articulated so that the levitation frames 2a-2j can adapt to the curve during cornering. In the process, each of the longitudinal connections 5a-5h connects two directly adjacent levitation frames 2a-2j, in the longitudinal direction X, to each other so that the levitation frames 2a-2j are connected to form the two rows 21, 22.

According to the present exemplary embodiment, the two rows 21, 22 of levitation frames 2a-2j are additionally connected to each other in the transverse direction Y by means of cross connections 6a-6d. Four cross connections 6a-6d are shown here by way of example, wherein the bogie 1 can also have more than four cross connections 6a-6d. The cross connections 6a-6d can have articulated joints, so that the levitation frames 2a-2j can likewise pivot with respect to the cross connections 6a-6d so as to adapt to the curve during cornering. As is shown in this exemplary embodiment, the cross connection 6c between the two levitation frames 2e, 2f is rigidly connected to these levitation frames. In this exemplary embodiment, the two levitation frames 2e, 2f thus also remain parallel to each other during cornering and/or do no pivot with respect to the cross connection 6c.

The bogie 1 furthermore has at least two cross members 3a-3d. In this exemplary embodiment, the bogie 1 has four cross members 3a-3d. The at least two cross members 3a-3d are spaced apart from each other in the longitudinal direction X and extend in the transverse direction Y. The cross members 3a-3d are furthermore connected to the two rows 21, 22 of levitation frames 2a-2j. In particular, each cross member 3a-3d is connected to two levitation frames 2a-2j. For example, the first cross member 3a is connected to the two levitation frames 2a, 2b. The cross members 3a-3d are each connected to the two levitation frames 2a-2j that are spaced from each other in the transverse direction Y.

Furthermore, the bogie 1 comprises at least two longitudinal members 4a-4d, which are arranged between the at least two cross members 3a-3d and are connected thereto. The two longitudinal members 4a-4d are furthermore spaced apart from each other in the transverse direction Y. In addition, the longitudinal members 4a-4d extend in the longitudinal direction X.

The cross members 3a-3d and the longitudinal members 4a-4d furthermore form at least one spring system 9a, 9b.

According to the present exemplary embodiment, the bogie 1 has two spring systems 9a, 9b. In the process, the two cross members 3a, 3b and the two longitudinal members 4a, 4b form the first spring system 9a. The two cross members 3c, 3d and the two longitudinal members 4c, 4d form the second spring system 9b.

According to the present exemplary embodiment, each spring system 9 comprises two cross members and two longitudinal members 3, 4.

According to the present exemplary embodiment, the cross member 3a is arranged between the two levitation frames 2a, 2b, and the cross member 3b is arranged between the two levitation frames 2c, 2d. As a result, only one cross member 3a-3d is arranged between two levitation frames 2a-2j that are spaced apart from each other in the transverse direction Y.

The spring systems 9a, 9b thus extend over four levitation frames 2a-2j.

Furthermore, the two spring systems 9a, 9b have, or the bogie 1 has, at least one suspension 10, 11 so as to spring mount the cross and/or longitudinal members 3a-3d, 4a-4d. The spring systems 9a, 9b or the longitudinal members 4a-4d furthermore comprise receiving means 18 for receiving a vehicle cabin 8. The vehicle cabin 8 can be spring mounted with respect to the levitation frame 2a-2j by means of the spring systems 9a, 9b or the at least one suspension 10, 11. The at least one suspension 10, 11 and the receiving means 18 are not shown until one of the following figures.

Features already described in the at least one preceding figure are not explained again for the sake of simplicity. Furthermore, features may also be described only the following figures. Further, for the sake of simplicity, identical features are denoted by identical reference numerals. In addition, not all features may be shown in the following figures for the sake of clarity. However, features that are shown in one or more of the preceding figures may also be present in one or more of the following figures. Furthermore, features may also be shown only in one or more of the following figures for the sake of clarity. Features that are only shown in one or more of the following figures can nevertheless also already be present in a preceding figure.

Figure 2:
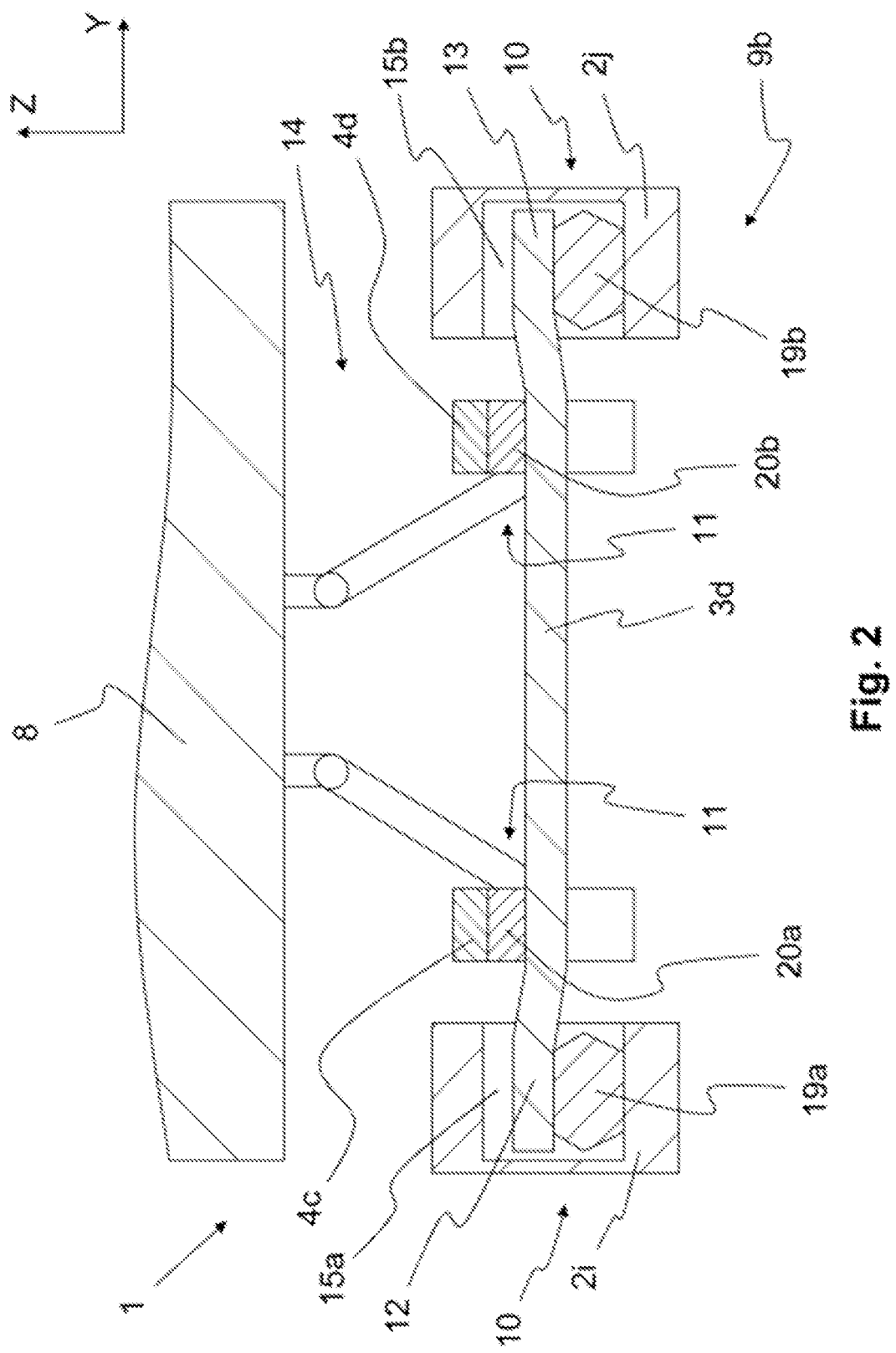
FIG. 2 shows a cross-sectional view through the bogie according to intersecting line A-A.

FIG. 2 shows a sectional view of FIG. 1 according to intersecting line A-A. FIG. 2 in particular shows the sectional view through the levitation frames 2i, 2j, through the cross member 3d, and the two longitudinal members 4c, 4d of FIG. 1.

The bogie 1 or the second spring system 9b shown in this sectional view further comprises at least one suspension 10, 11. Features described with respect to the second spring system 9b can, of course, also be present at the first spring system 9a.

According to the present exemplary embodiment, the first suspension 10 is arranged between the cross member 3d and the two levitation frames 2i, 2j so as to spring mount the cross member 3d with respect to the corresponding levitation frames 2i, 2j. In addition or as an alternative, the other cross members 3 can also have the first suspension 10.

According to the present exemplary embodiment, the first suspension 10 comprises at least one first spring element 19a, 19b. A respective first spring element 19a, 19b is arranged between the cross member 3d shown here and in each case one of the two levitation frames 2i, 2j. The first spring element 19a is arranged between a first end 12 of the cross member 3d and the associated levitation frame 2i. The first end 12 of the cross member 3d is also a first cross member end 12. The further first spring element 19b is arranged between a second end 13 of the cross member 3d and the associated levitation frame 2j. The second end 13 of the cross member 3d is also a second cross member end 13. With the aid of the first suspension 10, the cross member 3d is spring mounted with respect to the corresponding levitation frames 2i, 2j.

According to the present exemplary embodiment, the bogie 1 or the second spring system 9b, additionally or alternatively, has the second suspension 11. The second suspension 11 spring mounts the two longitudinal members 4c, 4d with respect to the cross member 3d. The second suspension 11 can also be arranged between the other longitudinal members 4 and the associated cross members 3.

The second suspension 11 comprises at least one second spring element 20a, 20b. According to the present exemplary embodiment, the second suspension 11 comprises two spring elements 20a, 20b, wherein a respective second spring element 20a, 20b is arranged in each case between a longitudinal member 4c, 4d and the cross member 3d. In this exemplary embodiment, the at least one spring element 20a, 20b is furthermore designed as a laminated spring. The second spring element 20a designed as a laminated spring is arranged between the longitudinal member 4c and the cross member 3d, and the second spring element 20b designed as a laminated spring is arranged between the longitudinal member 4d and the cross member 3d. As a result, the two longitudinal members 4c, 4d are spring mounted with respect to the cross member 3d with the aid of the second suspension 11.

In addition, the vehicle cabin 8, which is only shown partially here, can be coupled to the bogie 1 with the aid of a strut 14. The strut 14 is arranged at the longitudinal members 4c, 4d shown in this sectional view. The strut 14 can be attached to receiving means 18 not shown here. The receiving means 18 may also be referred to as attachment means. In addition or as an alternative, the strut 14 can also be the one or more receiving means 18. The longitudinal members 4 can have the receiving means 18.

The vehicle cabin 8 can be spring mounted with respect to the levitation frames 2a-2j with the aid of the at least one suspension 10, 11. As a result, the vehicle cabin 8 is damped with respect to the levitation frames 2a-2j.

According to the present exemplary embodiment, each of the two levitation frames 2i, 2j shown here has a recess 15a, 15b. The cross member 3d can be arranged in the recesses 15a, 15b so that the cross member 3d is at least partially arranged in the levitation frames 2i, 2j.

Features already described in the at least one preceding figure are not explained again for the sake of simplicity. Furthermore, features may also be described only in the following figures. Further, for the sake of simplicity, identical features are denoted by identical reference numerals. In addition, not all features may be shown in the following figures for the sake of clarity. However, features that are shown in one or more of the preceding FIGS. may also be present in one or more of the following figures. Furthermore, features may also be shown only in one or more of the following figures for the sake of clarity. Features that are only shown in one or more of the following figures can nevertheless also already be present in a preceding figure.

Figure 3:
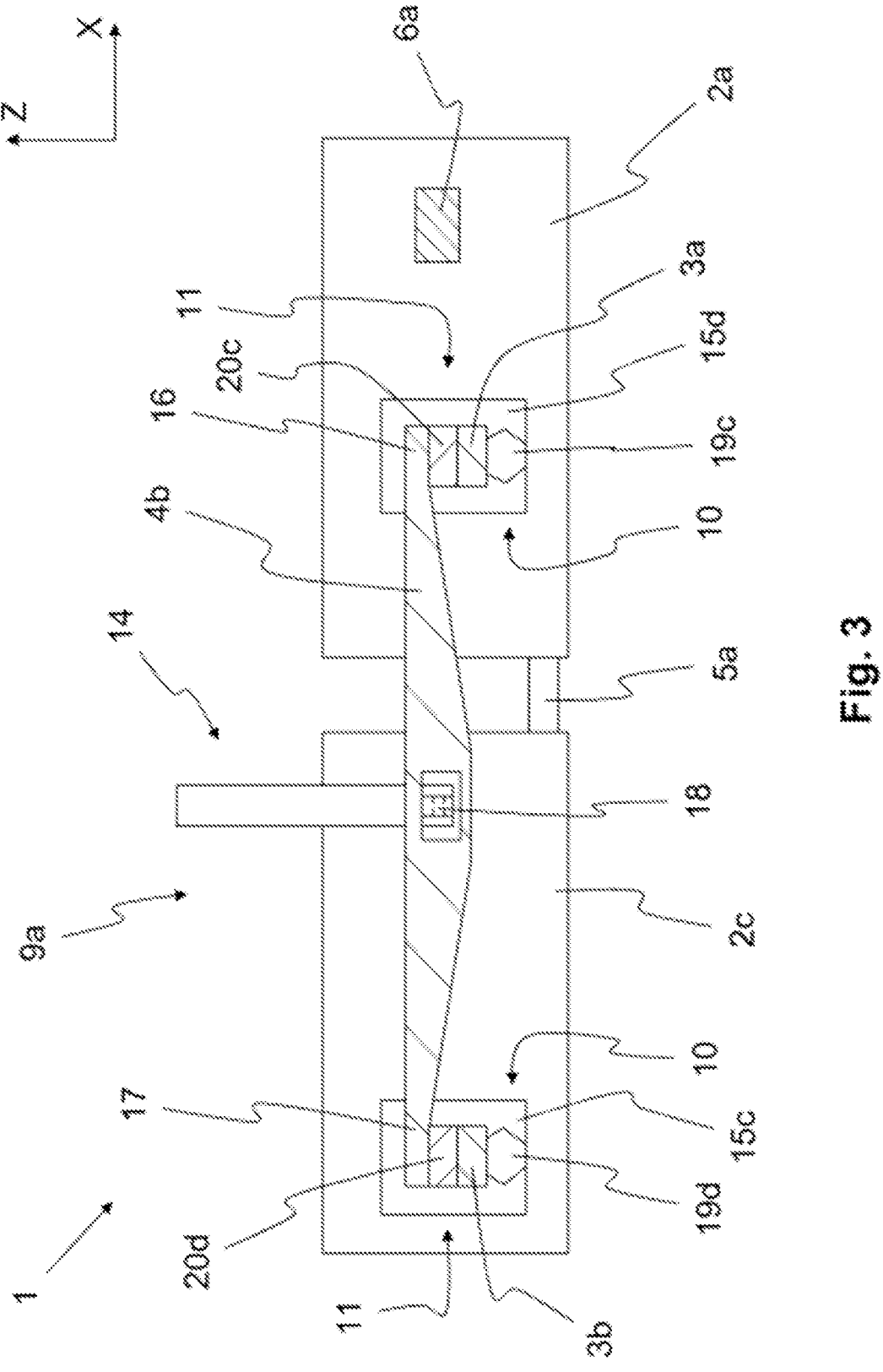
FIG. 3 shows a cross-sectional view through the bogie according to intersecting line B-B.

FIG. 3 shows a sectional view of the schematically illustrated bogie 1 according to FIG. 1 along the intersecting line B-B. The sectional view shown here is through the first spring system 9a. Features that are explained with respect to the first spring system 9a can, of course, also apply to the second spring system 9b.

The viewing direction here is along the transverse direction Y. Here, the two levitation frames 2a, 2c can be seen, which are connected to each other by means of the longitudinal connection 5a. Furthermore, a sectional view of the cross connection 6a is shown, which connects the two levitation frames 2a, 2b to each other in the transverse direction Y (refer to FIG. 1). Furthermore, a vertical direction Z is shown here.

As is shown here based on the longitudinal member 4b, the longitudinal members 4 have a first end 16 of the longitudinal member 4b and a second end 17 of the longitudinal member 4b. The first end 16 of the longitudinal member 4b is thus a first longitudinal member end 16. The second end 17 of the longitudinal member 4b is thus a second longitudinal member end 17.

The first end 16 of the longitudinal member 4b is connected to the first cross member 3a shown here, and the second end 17 of the longitudinal member 4b is connected to the second cross member 3b shown here.

In addition, the second suspension 11 is arranged between the longitudinal member 4b shown here and the two cross members 3a, 3b shown here. Furthermore, the second spring element 20c designed as a laminated spring is arranged between the longitudinal member 4b, in particular the first end 16 of the longitudinal member 4b, and the first cross member 3a shown here. The second spring element 20d, which is likewise designed as a laminated spring, is arranged between the longitudinal member 4b, in particular the second end 17 of the longitudinal member 4b, and the second cross member 3b shown here.

Furthermore, the first suspension 10 is arranged between the two cross members 3a, 3b shown here and the two levitation frames 2a, 2c. The first spring element 19c designed as a conical spring is arranged between the first cross member 3a and the levitation frame 2a, and the first spring element 19d designed as a conical spring is arranged between the second cross member 3b and the levitation frame 2c.

The longitudinal member 4b furthermore has the receiving means 18 at which the vehicle cabin 8, which is not shown here, can be received. The receiving means 18 can be designed as a pendulum support, at which the strut 14 is received, which in turn carries the vehicle cabin 8. The receiving means 18 can furthermore also comprise the strut 14. The receiving means 18, and in particular the pendulum support, can be designed such that the strut 14 can be rotated or pivoted about the longitudinal direction X, so that the vehicle cabin 8 can tilt or pivot about the longitudinal direction X relative to the bogie 1.

The spring system 9a shown here, by means of which the vehicle cabin 8 is spring-mounted with respect to the bogie 1, comprises the first and second suspensions 10, 11. In this exemplary embodiment, the spring system 9a shown here, or the first suspension 10, comprises a total of four first spring elements 19, which can be designed as conical springs, for example.

Furthermore, the second suspension 11 likewise comprises four second spring elements 20, which can be designed as laminated springs.

In addition, the first suspension 10 can comprise laminated springs and/or the second suspension 11 can comprise conical springs.

In addition or as an alternative, the longitudinal members 4 can also be designed to be spring-loaded. The longitudinal members 4 can be spring-loaded along the vertical, longitudinal and/or transverse directions Z, X, Y. As a result, the vehicle cabin 8, which is not shown here, can be spring mounted with respect to the bogie 1. In particular, the spring loading of the longitudinal members 4 along the vertical direction Z is created in that the longitudinal members 4 are able to flex and rebound between the corresponding cross members 3. The spring loading of the longitudinal members 4 can be achieved, for example, by appropriately selecting the material. The longitudinal members 4 are thus similar to a leaf spring.

Figure 4:
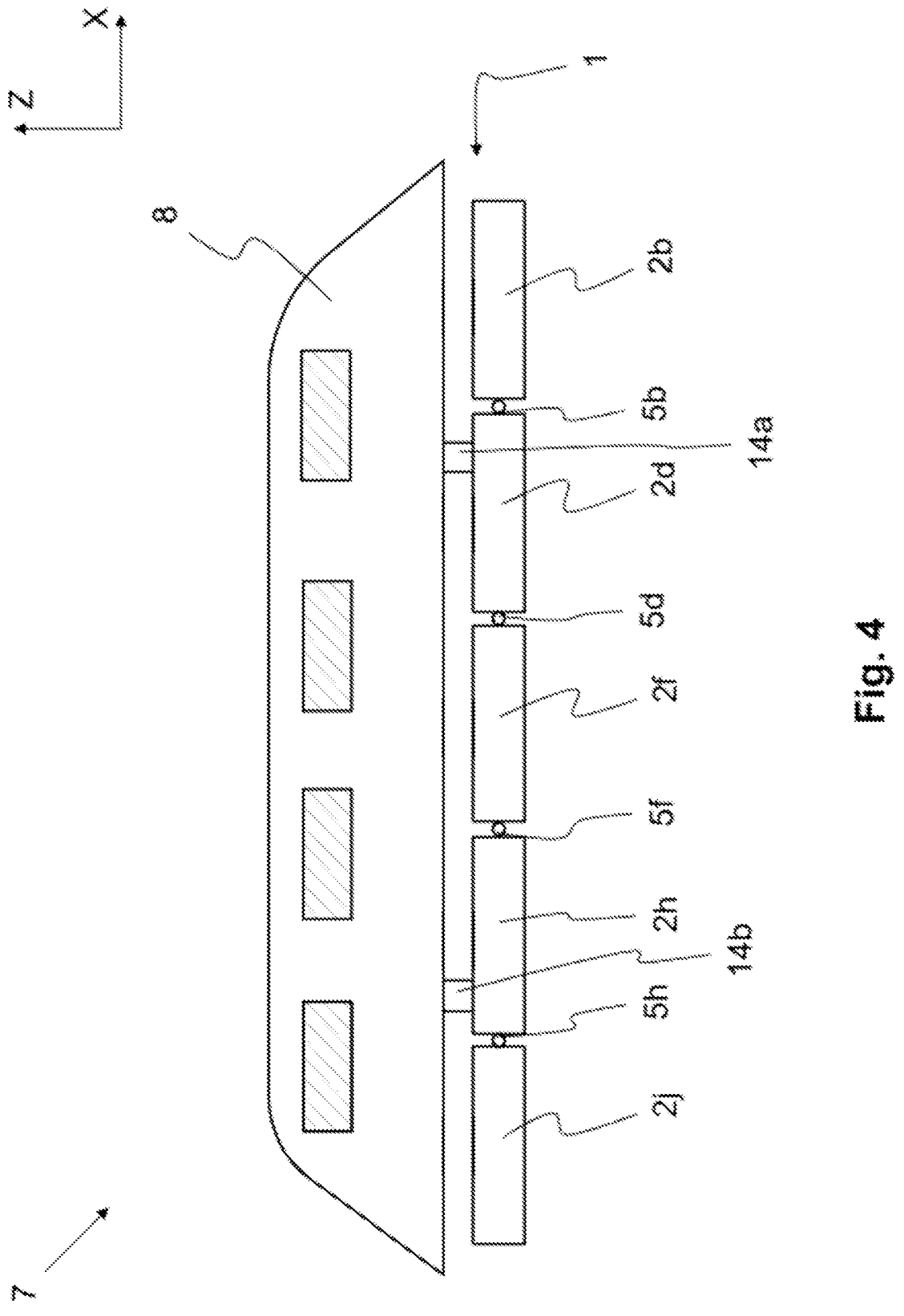
FIG. 4 shows a schematic view of the levitation vehicle including the bogie.

FIG. 4 shows a schematic side view of the levitation vehicle 7 of a magnetic levitation system including the bogie 1 and the vehicle cabin 8. The five levitation frames 2b, 2d, 2f, 2h, 2j shown in the side view are shown here, which are each connected to each other by means of the longitudinal connections 5b, 5d, 5f, 5h.

Furthermore, two strut 14a, 14b are shown, which receive the vehicle cabin 8. The first spring system 9a is assigned to the first strut 14a, and the second spring system 9b is assigned to the second strut 14b, so as to spring mount the vehicle cabin 8 with respect to the bogie 1.

The present invention is not limited to the shown and described exemplary embodiments. Modifications within the scope of the claims are possible, and it is possible to combine the features, even if these are shown and described in different exemplary embodiments.

LIST OF REFERENCE NUMERALS

1 bogie
2 levitation frame
3 cross member
4 longitudinal member
5 longitudinal connection
6 cross connections
7 levitation vehicle
8 vehicle cabin
9 spring system
10 first suspension
11 second suspension
12 first end of the cross member
13 second end of the cross member
14 strut
15 recess
16 first end of the longitudinal member
17 second end of the longitudinal member
18 receiving means
19 first spring elements
20 second spring elements

21 first row of levitation frames
22 second row of levitation frames
X longitudinal direction
Y transverse direction
Z vertical direction

The invention claimed is:

1. A bogie for a guideway-bound levitation vehicle of a magnetic levitation system, comprising:
   two rows of multiple levitation frames which are spaced apart from each other in a transverse direction of the bogie and extend in a longitudinal direction of the bogie;
   at least two cross members which are spaced apart from each other in the longitudinal direction and extend in the transverse direction and which connect the two rows of multiple levitation frames to each other;
   at least one longitudinal member which extends in the longitudinal direction and is connected to the cross members; and
   at least one receiving means for receiving a vehicle cabin of the levitation vehicle,
   wherein,
      two longitudinal members, which are spaced apart from each other in the transverse direction, are arranged between two cross members spaced apart from each other in the longitudinal direction and are connected to the two cross members; and
      the cross members are spring mounted with respect to the levitation frames by a first suspension and/or that the longitudinal members are spring mounted with respect to the cross members by a second suspension.

2. The bogie according to claim 1, wherein the bogie comprises at least one suspension for spring mounting the vehicle cabin, and/or
   only one of the two cross members is arranged between two levitation frames spaced apart from each other in the transverse direction and is connected to the two levitation frames, and/or
   a first cross member of the two cross members between which the two longitudinal members are arranged is arranged between two levitation frames spaced apart from each other in the transverse direction and is connected thereto, and a second cross member is arranged between two other, in particular directly adjacent, levitation frames, spaced apart from each other in the transverse direction, and is connected thereto.

3. The bogie according to claim 1, wherein the longitudinal members are arranged parallel to the levitation frames and/or spaced apart from the levitation frames in the transverse direction.

4. The bogie according to claim 1, wherein the first suspension has first spring elements and/or the second suspension has second spring elements.

5. The bogie according to claim 4, wherein the first and/or second spring elements comprise conical and/or laminated springs.

6. The bogie according to claim 1, wherein the cross members and/or the longitudinal members are designed to be elastic and/or spring-loaded, in particular in a vertical, longitudinal and/or transverse direction.

7. The bogie according to claim 1, wherein the cross members have two ends, a first end of the cross members being connected to a first levitation frame, and the second end of the cross members located opposite the first end being connected to a second levitation frame spaced apart from the first levitation frame in the transverse direction.

8. The bogie according to claim 1, wherein the longitudinal members have two ends, a first end of the longitudinal members being connected to a first cross member, and a second end of the longitudinal members located opposite the first end being connected to a second cross member spaced apart from the first cross member in the longitudinal direction.

9. The bogie according to claim 7, wherein the levitation frames have a recess, and the ends of the cross members are arranged in the recess with the respective levitation frames.

10. The bogie according to claim 1, wherein the longitudinal members are rotatably connected to the cross members.

11. The bogie according to claim 1, wherein the receiving means are arranged in a central region of, and in particular centrally in, the longitudinal members.

12. The bogie according to claim 1, wherein the receiving means comprises a strut or that the receiving means can receive the strut, at which the vehicle cabin can be arranged, in particular directly.

13. The bogie according to claim 1, wherein the levitation frames are connected to each other in the longitudinal direction by means of longitudinal connections and/or in the transverse direction by means of cross connections.

\* \* \* \* \*